Patented July 13, 1937

2,086,822

UNITED STATES PATENT OFFICE 2,086,822

PROCESS FOR PRODUCING AROMATIC ASYMMETRICAL THIOUREA DERIVATIVES

Max Schubert and Karl Schütz, Frankfort-on-the-Main-Fechenheim, Germany, assignors to General Aniline Works, Inc., New York, N. Y., a corporation of Delaware No Drawing. Application September 1, 1933, Serial No. 687,912. In Germany November 1, 1932

1 Claim. (Cl. 260—125)

Our invention relates to a process for producing asymmetrical thiourea-derivatives.

According to De Clairmont (cf. Ber. d. Deutschen Chem. Ges. vol. 9, page 446, and vol. 10, page 495) mono-aryl-thiourea-derivatives are obtained by the interaction of the corresponding arylamine hydrochlorides in aqueous solution with alkali thiocyanates. This reaction takes place according to the following scheme:

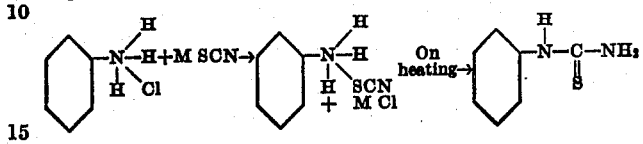

(M=alkali metal)

However, this method is not suitable for application on a technical scale, in the first place since the reaction only takes place with the formation of by-products according to the character of the amine used particularly of symmetrical diaryl-thiourea compounds (cf. Bertram, Ber. d. Deutschen Chem. Ges. vol. 25, page 48) and especially since difficulties pertaining to apparatus are unavoidable. In most cases it is necessary to evaporate the reaction mixture to dryness in order to transform the thiocyanic salts formed as primary products according to the above scheme and subsequently to heat for some time in the dry state, whereby the products occur in a form very unfavorable for further working up and the apparatus is strongly affected.

According to our present invention asymmetrical thiourea derivatives of the general formula:

in which R represents a radicle of the benzene, naphthalene, carbazole and quinoline series and $R_2$ stands for hydrogen, an alkyl or phenyl group, are obtained by a smooth reaction in excellent yield and purity by heating aromatic amines of the general formula:

$$R—NH_2$$

in which R has the above significance, in the form of the mineral acid salts with alkali thiocyanates in the presence of inert organic diluents.

For carrying out the reaction it is not necessary to start from mineral acid salts of the amines. The process may also be effected in such a manner that the bases used as starting materials are transformed into the mineral acid salts in the presence of inert diluents for example by adding the calculated quantity of sulfuric acid or by introducing hydrochloric acid gas.

The smooth formation of the thiourea derivatives is surprising since the first phase of the present reaction (conversion of the mineral acid salts into thiocyanic salts) is an ionic reaction which according to the present method takes place surprisingly smoothly even in the case of the absolute absence of water and of complete insolubility of both components in the inert diluent used.

So far as the thiourea-derivatives are formed by starting from nitrogeneous heterocyclic compounds particularly thiourea derivatives of the carbazole series of the formula:

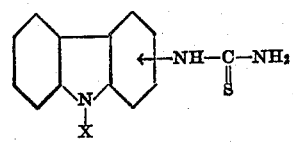

wherein X is hydrogen or an alkyl group, they are new compounds. Generally speaking the thiourea derivatives formed according to the present process precipitate in a finely divided crystalline form and after freeing from the inorganic salts formed in the reaction they are obtained immediately in the pure state exhibiting the melting points given in literature. This fact is a particular advantage, as it is not necessary to isolate the reaction products for further treatment but further reactions can be carried out therewith immediately in a single operation. For example the production of 2-amino-benzo-thiazoles according to U. S. Patent No. 2,003,444, patented June 4, 1935 (application Serial No. 541,534, filed June 1, 1931, by Richard Herz and Max Schubert) or according to Hugershoff (cf. Ber. der Deutschen Chem. Ges. vol. 36, page 3121), can be combined in one operation with the formation of the thiourea derivatives used as starting materials so that it is possible to produce the 2-aminobenzothiazole compounds by starting from the corresponding arylamines in one apparatus without isolating intermediates.

In order to further illustrate our invention the following examples are given, the parts being by weight and all temperatures in centigrade degrees; but we wish it, however, to be understood that our invention is not limited to the particular conditions or specific products mentioned therein:—

Example 1

To a suspension of 13 parts of aniline hydrochloride in about 130 parts of chlorobenzene 8 parts of ammonium thiocyanate or the corresponding quantity of the sodium salt are added and the mixture is stirred for 6 to 8 hours at about 95–100°. When cool the precipitate formed is filtered off, washed with water and dried. It consists of phenyl-thiourea of the formula:

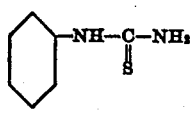

obtained immedately in the pure form of melting point 152–154°.

Example 2

To a suspension of 17.3 parts of p-phenetidine hydrochloride in about 70 parts of benzine or butylalcohol 9 parts of ammonium thiocyanate are added and the mixture is stirred for 7–8 hours at about 90–100°. In this manner the 4-ethoxy-phneyl-thiourea of the forumula:

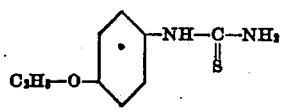

of 171–173° melting point is formed with an almost theoretical yield.

The same result is obtained when working as follows:

13.7 parts of p-phenetidine are dissolved in about 70 parts of chlorobenzene and to the solution while stirring thoroughly 5.4 parts of sulfuric acid of 66° Bé. and subsequently 9 parts of ammonium thiocyanate are added and the mixture is heated at about 90° for 3 hours.

When adding to the suspension of 4-ethoxy-phenylthiourea thus formed without isolation 20.8 parts of disulfurdichloride immediately in a pure form the 2-amino-6-ethoxy-benzothiazol is obtained.

Example 3

Into a solution of 10.8 parts of p-toluidine in about 70 parts of chlorobenzene while stirring thoroughly 5.4 parts of sulfuric acid of 66° Bé. are allowed to flow in, then 9 parts of sodium thiocyanate are added and the mixture is heated at about 110° for 3 hours. When cool the reaction product is filtered off, washed out and dried. It represents a pure p-tolyl-thiourea of the formula:

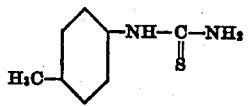

melting at 185–186°.

In the same manner p-aminodiphenyl and benzidine are transformed into the corresponding 4-diphenylthiourea and 4.4′-diphenyldithiourea respectively.

In order to convert the p-tolylthiourea into the corresponding 6 - methyl - 2 - amnio - benzothiazol one does not need to isolate the tolylthiourea, but immediately to the above suspension in chlorobenzene 15 parts of bromine or 16–18 parts of sulfurylchloride respectively are added.

Example 4

To a suspension of 17 parts of diphenylamine hydrochloride in about 120 parts of o-dichlorobenzene 10 parts of ammonium thiocyanate are added and the mixture is heated for a longer time at temperatures ranging from 110 to 130°. The reaction product which is isolated in the usual manner, some quantities of by-products being removed by extraction with hot water and boiling benzene, represents diphenylthiourea of the formula:

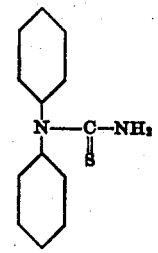

which melts at about 212° when recrystallized from butylalcohol.

Example 5

To a suspension of 20.7 parts of N-ethyl-1-naphthylamine hydrochloride in about 70 parts of chlorobenzene 8 to 9 parts of ammonium thiocyanate are added and the mixture is heated while stirring at 90 to 100° for 3 to 4 hours and then to boiling for about 2 hours. When cool the reaction product is filtered off, washed out and dried. It crystallizes from alcohol as compact colorless prisms of 156–158° melting point and represents the pure asymmetrical 1-naphthyl-ethyl-thiourea of the formula:

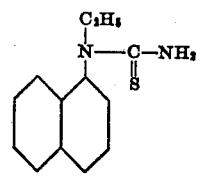

Example 6

To a suspension of 21 parts of 8-methoxy-1-naphthyl-amine hydrochloride in about 130 parts of chlorobenzene 8 parts of ammonium thiocyanate are added and the mixture is held while stirring for 6 to 8 hours at 95–100°. In this manner the pure 8-methoxy-1-naphthyl-thiourea of the formula:

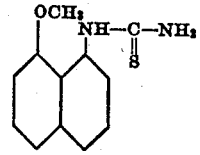

of 185 to 187° melting point which was unknown hitherto is obtained.

When starting likewise from 4-amino-indazole (cf. Ber. d. Deutschen Chem. Ges. vol. 53, page 1223) the corresponding new indazylthiourea of the formula:

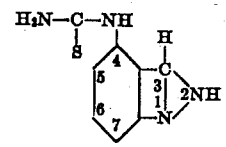

is obtained which crystallizes from butylalcohol as colorless leaflets of 225–226° melting point.

Example 7

Into a suspension of 23 parts of 1.5-naphthylene-diamine hydrochloride in about 140 parts of chlorobenzene 18 to 20 parts of ammonium thiocyanate are added and the mixture is heated while stirring for about 3 hours at 70 to 80° and then for 10 to 15 hours at 95 to 100°. When cool the formed precipitate is filtered off, washed out with hot very dilute hydrochloric acid and dried. The formed new 1.5-naphthylene-dithiourea of the formula:

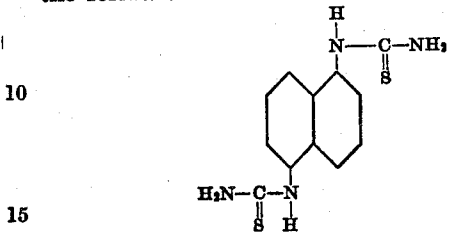

melts at about 250 to 252°.

Example 8

To a suspension of 22 parts of 2-amino-carbazol hydrochloride in about 200 parts of chlorobenzene 8 to 9 parts of ammonium thiocyanate are added and the mixture is heated while stirring for 6 to 8 hours at 120 to 125°. In this manner the pure 2-carbacyl-thiourea (melting at about 278°) of the formula:

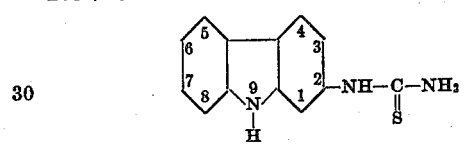

is obtained.

In the same manner by starting from 3-amino-9-ethyl-carbazol the corresponding thiourea-derivative of the formula

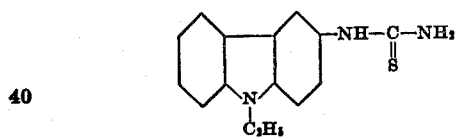

is obtained which crystallizes from butylalcohol as colorless leaflets of 208 to 210° melting point.

Example 9

17.8 parts of 5-amino-8-chloroquinoline of 160 to 162° melting point are dissolved in the about tenfold quantity of boiling chlorobenzene and then hydrochloric acid gas is introduced into the solution whereby the precipitating hydrochloride is obtained in the form of a finely divided suspension. An excess of hydrochloric acid is removed by blowing in air. Then 12 parts of ammonium thiocyanate are added and the mixture is heated for about 12 hours on a boiling water bath. When cool the formed precipitate is filtered off, exactly washed out with water and dried. The formed 8-chloro-5-quinolyl-thiourea of the formula:

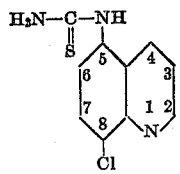

represents a light yellow crystalline powder which melts at about 210 to 211° with decomposition.

We claim:

A process for producing organic thiourea derivatives which comprises heating, in the presence of an inert organic diluent, an alkali metal thiocyanate with a mineral acid salt of an aromatic amine of the general formula:

wherein R represents a radicle selected from the group consisting of radicles of the benzene and naphthalene series, and $R_2$ represents a member of the group consisting of the hydrogen, alkyl group and phenyl group.

MAX SCHUBERT.
KARL SCHÜTZ.